US008051293B2

(12) United States Patent
Calhoon et al.

(10) Patent No.: US 8,051,293 B2
(45) Date of Patent: *Nov. 1, 2011

(54) DATA PROCESSING SYSTEMS AND METHODS

(75) Inventors: Sean Calhoon, Lake Oswego, OR (US); J. Scott Carr, Los Gatos, CA (US); Tony F. Rodriguez, Portland, OR (US)

(73) Assignee: Digimarc Corporation, Beaverton, OR (US)

( * ) Notice: Subject to any disclaimer, the term of this patent is extended or adjusted under 35 U.S.C. 154(b) by 653 days.

This patent is subject to a terminal disclaimer.

(21) Appl. No.: 12/115,341

(22) Filed: May 5, 2008

(65) Prior Publication Data

US 2009/0144534 A1     Jun. 4, 2009

Related U.S. Application Data

(63) Continuation of application No. 11/101,188, filed on Apr. 6, 2005, now Pat. No. 7,370,190.

(60) Provisional application No. 60/659,022, filed on Mar. 3, 2005.

(51) Int. Cl.
     *G06F 15/177*          (2006.01)
     *H04L 9/32*            (2006.01)

(52) U.S. Cl. .............................. 713/176; 713/2; 463/29

(58) Field of Classification Search .............. 713/2, 176; 463/29

See application file for complete search history.

(56) References Cited

U.S. PATENT DOCUMENTS

| | | | |
|---|---|---|---|
| 5,643,086 A | 7/1997 | Alcorn et al. | |
| 5,732,207 A | 3/1998 | Allen et al. | |
| 5,893,095 A | 4/1999 | Jain et al. | |
| 5,958,037 A | 9/1999 | Dreyer et al. | |
| 6,148,407 A | 11/2000 | Auesmith | |
| 6,161,213 A | 12/2000 | Lofstrom | |
| 6,301,370 B1 | 10/2001 | Steffens et al. | |
| 6,345,104 B1 | 2/2002 | Rhoads | |
| 6,499,105 B1 | 12/2002 | Yoshiura et al. | |
| 6,549,638 B2 | 4/2003 | Davis et al. | |
| 6,557,104 B2 | 4/2003 | Vu et al. | |
| 6,564,318 B1 | 5/2003 | Gharda et al. | |
| 6,598,165 B1 | 7/2003 | Galasso | |
| 6,614,914 B1 | 9/2003 | Rhoads et al. | |
| 6,618,484 B1 | 9/2003 | Van Wie et al. | |
| 6,622,179 B2 | 9/2003 | Welder | |
| 6,633,976 B1 | 10/2003 | Stevens | |
| 6,640,304 B2 | 10/2003 | Ginter et al. | |
| 6,658,568 B1 | 12/2003 | Ginter et al. | |
| 6,668,325 B1 | 12/2003 | Collberg et al. | |
| 6,734,864 B2 | 5/2004 | Abgrall | |
| 6,738,788 B1 | 5/2004 | Horng et al. | |
| 6,750,985 B2 | 6/2004 | Rhoads | |
| 6,768,808 B2 | 7/2004 | Rhoads | |
| 6,768,809 B2 | 7/2004 | Rhoads | |
| 6,771,797 B2 | 8/2004 | Ahmed | |
| 6,772,313 B2 | 8/2004 | Oh | |
| 6,773,953 B1 | 8/2004 | Gaylord | |
| 6,785,815 B1 | 8/2004 | Serret-Avila | |
| 6,788,800 B1 | 9/2004 | Carr et al. | |
| 6,791,572 B1 | 9/2004 | Cloney et al. | |
| 6,802,447 B2 | 10/2004 | Horng | |
| 6,804,376 B2 | 10/2004 | Rhoads et al. | |
| 6,823,075 B2 | 11/2004 | Perry | |
| 6,829,710 B1 | 12/2004 | Venkatesan et al. | |
| 6,832,316 B1 | 12/2004 | Sibert | |
| 6,834,308 B1 | 12/2004 | Ikezoye et al. | |
| 6,834,343 B1 | 12/2004 | Burns | |
| 6,947,571 B1 | 9/2005 | Rhoads | |
| 7,055,033 B2 | 5/2006 | Guthery | |
| 7,100,036 B2 | 8/2006 | Schwartz | |
| 7,111,167 B1 | 9/2006 | Yeung | |
| 7,370,190 B2 * | 5/2008 | Calhoon et al. | ................... 713/2 |
| 2002/0028000 A1 | 3/2002 | Conwell | |
| 2002/0120849 A1 | 8/2002 | McKinley et al. | |
| 2003/0149879 A1 | 8/2003 | Tian et al. | |
| 2003/0195033 A1 | 10/2003 | Gazdic et al. | |
| 2004/0064686 A1 | 4/2004 | Miller et al. | |
| 2004/0247155 A1 | 12/2004 | Eguchi | |
| 2005/0105761 A1 | 5/2005 | Zimmer | |
| 2005/0204156 A1 * | 9/2005 | Chang | ........................... 713/200 |
| 2006/0126887 A1 | 6/2006 | Talstra et al. | |

FOREIGN PATENT DOCUMENTS

WO     WO0161508     8/2001

OTHER PUBLICATIONS

Lofstrom, "IC Identification Circuit Using Device Mismatch," Proc. of ISSCC 2000, pp. 372-373, Feb. 2000.
Lee et al, "A Technique to Build a Secret Key in Integrated Circuits for Identification and Authentication Applications," Proceedings of the IEEE VLSI Circuits Symposium, Jun. 2004.
Gassend et al, "Delay-Based Circuit Authentication and Applications," Proc. of 2003 ACM Symp. on Applied Computing, pp. 294-301, 2003.
Gassend et al, "Identification and Authentication of Integrated Circuits," Concurrency and Computation: Practice and Experience, 2003.
Gassend et al, "Silicon Physical Random Functions," Proc. of the Computer and Communication Security Conference, May 2002.
Gassend et al, "Controlled Physical Random Functions," Proc. of the 18th Annual Computer Security Applications Conference, 2002.
Gassend, "Physical Random Structures," MIT Technical Report MIT-LCS-TR-881, Jan. 2003.
Ravikanth, "Physical One-Way Functions," Ph.D. Thesis, MIT, Mar. 2001. Clarke et al, "Secure Hardware Processors Using Silicon Physical One-Way Functions," MIT, Mar. 2002.
International Preliminary Report on Patentability for PCT/US06/07327, issued Sep. 12, 2007.
International Search Report on PCT/US06/07327, mailed Jul. 17, 2007.
Non Final Office Action on U.S. Appl. No. 11/101,188, mailed Jun. 18, 2007.
Notice of Allowance on U.S. Appl. No. 11/101,188, mailed Dec. 17, 2007.

* cited by examiner

*Primary Examiner* — Vincent Tran

(57) ABSTRACT

Various improvements to data processing systems involve enhancements to BIOS functionality, use of identifiers associated with specific instances of hardware, and data hiding techniques—sometimes alone, sometimes in combination. Many of these improvements can be applied to increase the security of computer systems, and networks of which they form part.

22 Claims, No Drawings

DATA PROCESSING SYSTEMS AND METHODS

RELATED APPLICATION DATA

This application is a continuation of application Ser. No. 11/101,188, filed Apr. 6, 2005 (now U.S. Pat. No. 7,370,190), which claims priority to provisional application 60/659,022, filed Mar. 3, 2005.

TECHNICAL FIELD

In different embodiments, the present disclosure addresses improvements in a variety of technologies, including digital watermarking, BIOS, and data processing system security.

BACKGROUND

Digital watermarking technology (also known as steganography) encompasses a great variety of techniques by which one or more bits of digital data are hidden in some other object, without leaving human-perceptible evidence of alteration or data representation.

Digital watermarks can take many different forms, and serve many different applications (e.g., authenticating objects; conveying or linking to object metadata; specifying rules for use; triggering device actions or content delivery; conveying decryption instructions, logically binding content to users or devices, etc.). Patents illustrating same include U.S. Pat. Nos. 6,614,914, 6,823,075, 6,804,376, 6,788,800, 6,771,797, 6,768,809, 6,768,808, and 6,750,985.

The most familiar forms of steganography are those in which information is concealed in objects such as sound and image files. For example, the least significant bits of pixels defining a graphic can be altered to convey plural bits of hidden information. The graphic appears essentially pristine to a human viewer, but a suitably-programmed processor can decode the plural-bit payload from the graphic data. Similarly, a graphic may be stored in higher resolution than it can be displayed, and the display functions may disregard the superfluous information—allowing these extra thousands of bits to be used for other purposes. Many more sophisticated techniques for hiding information are detailed in the watermarking patent literature, such as the patents referenced above. However, objects that can conceal hidden data include more than just audio and imagery files. There is a growing field of art in concealing data within software instructions, e.g., in the pattern or order of instructions, in the pattern of registry usage, etc. Some such techniques are detailed, for example, in U.S. Pat. Nos. 6,834,343 and 6,829,710.

BIOS technology is also well known, and traditionally has served two primary purposes. The first is to initialize and test a computer's hardware and to collect hardware configuration information (the Power On Self Test process—POST). The second is to provide the collected hardware information to a loader that initiates the operating system (OS). Exemplary patent publications in the field include U.S. Pat. Nos. 6,557,104 6,791,572 6,772,313 6,734,864 6,633,976 6,622,179 6,598,165 and 6,564,318.

DETAILED DESCRIPTION

Hardware-Based Identification

There are various known ways to identify electronic devices and systems—many of which permit even different instances of the same type of device to be distinguished.

One such approach is to physically design or program different instances a device (e.g., a chip, such as an ASIC) to have different unique identifiers (UIDs), e.g., by expressing the UIDs as hardwired data that can be read from the chip. In simple implementations this can be accomplished by burning links on a chip die, or storing the desired UID in on-chip ROM. More complex techniques slightly alter the photolithographic patterns by which each instance of a circuit is fabricated.

Intel's Pentium III microprocessor used a variant of such an approach, employing an on-chip EEPROM that was programmed by Intel to store a UID, together with contract related data (e.g., customer), and process related data (e.g., wafer test results). This Intel arrangement is detailed in U.S. Pat. Nos. 5,732,207 and 5,958,037.

Other deterministic approaches for marking hardware circuitry are also known. For example, Intel has proposed (U.S. Pat. No. 6,773,953) an image sensor in which certain pixels are deliberately damaged during fabrication (e.g., with a laser or electron beam) so that all images captured by the sensor evidence a unique pattern of flaws that serve as an identifier.

Hardware serialized in accordance with such deterministic approaches can be physically examined to discern the identifier. A twin device (i.e., one with the same UID) can then be fabricated or programmed. In applications where this characteristic poses a liability, other identification techniques can be employed.

One alternative class of hardware identification techniques uses so-called Physical Unclonable Functions (PUFs, sometimes referred to as Physical Random Functions). Basically, such techniques recognize that chip fabrication processes introduce subtle variations in each instance of a manufactured physical device, which variations can serve as distinguishing features to uniquely identify the device. Since identifiers derived from such features arise as a consequence of generally random processes in manufacturing, it is generally not possible to fabricate a twin chip. (Moreover, any attempt to externally probe the device with a logic analyzer, or the like, to try and characterize such variations, introduces enough stray capacitance and other loading effects to change the subtle parameters being measured.)

One such approach, marketed by SiidTech of Beaverton, Oreg. under the name Silicon Fingerprinting, employs an array of paired MOSFET transistors having interconnected sources and gates. The measurable output of each MOSFET pair represents the difference between their respective drain currents, and is highly susceptible to fluctuations that normally occur in chip fabrication (e.g., nominally identical dimensions in the two transistors do not exactly match each other due to factors such as the random distribution of photons exposing the photolithography mask, and the random distribution of semiconductor doping atoms from thermal diffusion and ion implantation). One transistor in each pair will inevitably have a slightly higher drain current than the other, and this is evidenced in the pair's output signal. Collectively, the array of paired transistors thereby yields a binary identifier that is essentially unique to that chip. The SiidTech technology is further described in U.S. Pat. Nos. 6,161,213 and 6,802,447, and in Lofstrom, "IC Identification Circuit Using Device Mismatch," Proc. of ISSCC 2000, pp. 372-373, February 2000. A database system that logically binds system information to a particular chip through the SiidTech identification technology is detailed in U.S. Pat. No. 6,738,788.

Another PUF technique that is the subject of research at MIT is detailed in Lee et al, "A Technique to Build a Secret Key in Integrated Circuits for Identification and Authentication Applications," Proceedings of the IEEE VLSI Circuits Symposium, June, 2004. This technique exploits statistical delay variations of wires and transistors across ICs to produce a secret key unique to each IC.

The Lee work builds on related efforts at MIT detailed in Gassend et al, "Delay-Based Circuit Authentication and Applications," Proc. of 2003 ACM Symp. on Applied Computing, pp. 294-301; Gassend et al, "Identification and Authentication of Integrated Circuits," Concurrency and Computation: Practice and Experience, 2003; Gassend et al, "Silicon Physical Random Functions," Proc. Of the Computer and Communication Security Conference, May, 2002; Gassend et al, "Controlled Physical Random Functions," Proc. of the 18th Annual Computer Security Applications Conference, 2002; and Gassend, "Physical Random Structures," MIT Technical Report MIT-LCS-TR-881, January, 2003.

An interesting feature of the MIT family of PUF-based identification techniques is that they are well-suited for challenge-response security policies. Since the precise behavior of a device depends on the applied stimuli—as well as on the device's unique hardware idiosyncrasies—an attacker's observation of a device's responses to past stimuli provides no guidance about how the device will respond to different stimuli. (And the same past stimuli, applied to a different instance of the same type of hardware, will also yield a different response, due to the inherent random variations.)

Another class of identification technology seeks to uniquely identify a hardware and/or software system by generating an identifying "fingerprint" (sometimes termed a "system signature") from a plurality of system traits. As applied to a computer system, for example, the traits may include the type and ID of processor, a cache ID, a parameter identifying the amount of RAM installed in the system, the number of cylinders and heads of a hard drive, the Ethernet address of a network card, a video card manufacturer ID or model number, the version of the operating system, etc., etc. Such arrangements are well known; U.S. Pat. No. 6,148,407 is exemplary. (A degenerate case of this approach is simply to identify a system by a single, hopefully-distinctive, parameter. MAC addresses are commonly used for this purpose.)

A technology that is related to the foregoing technologies is Physical One-Way Functions (POWFs). These are functions that combine an input value with the state of a physical system to produce an output value. Like classical one-way functions, POWFs are difficult to invert: given an output value, it is hard to find an input value and a physical system that would produce that output. (Such arrangements are described, e.g., in Ravikanth, "Physical One-Way Functions," Ph.D. Thesis, MIT, March, 2001, and Clarke et al, "Secure Hardware Processors Using Silicon Physical One-Way Functions," MIT, March, 2002.)

(All of the above-referenced publications build on related, earlier, work that is generally cited in these publications. The artisan is presumed to be familiar with such related work, as well as the techniques detailed in these publications.)

It will be recognized that these identification techniques can be used in conjunction with each other. For example, a computer system may be identified with reference to a PUF-based UID of its microprocessor, and a Silicon Fingerprint of its graphic card. Or a system signature may be based on one or more such hardware identifiers, together with other system traits. Similarly, any of these hardware-based identification techniques can form part of an identification arrangement employing other information. For example, an online vendor such as Amazon or iTunes may employ an identifier that is based on one or more of the foregoing techniques for uniquely identifying the user's hardware, in conjunction with parameters or numbering for their internal use. Etc., etc.

Likewise, it will be recognized that identifiers for particular physical devices or data processing systems produced by the foregoing techniques can be further processed, to advantageous effect. For example, hashing may be used to distill one or several such IDs down to a smaller identifier. Likewise, digital signature technology can be employed to create an encrypted hash of one or several such IDs—one assuring that the ID(s) hasn't been tampered with (e.g., one that can be verified by reference to the public key corresponding to the private key with which it has been encrypted). Or such an identifier can be used to seed a random number generator that generates a sequence of data—each of which can be used as an identifier. All such processes shall be regarded as yielding hardware-based identifiers.

The foregoing technologies are exemplary of those that can be used to produce an identifier for a particular physical device or data processing system. It will be recognized, however, that this listing is far from exhaustive. Moreover, additional identification technologies continue to be invented. Accordingly, when the present application makes reference to a hardware-based identifier or the like, it should be recognized that myriad different identifying techniques can be used—not just those detailed above.

BIOS Support for Watermarking

BIOS software can be equipped to facilitate digital watermark operations. For example, the BIOS can provide services—callable by applications programs, operating systems, and other processes (e.g., peripheral drivers)—that are useful in performing digital watermark encoding and/or decoding operations. In some arrangements, a content object (e.g., an image or audio clip, or portion thereof) is passed to the BIOS in one of certain supported formats, and a watermark is encoded therein, or decoded therefrom. In decoding, the BIOS can return the decoded payload data, or can simply indicate whether a watermark was found.

One standard image format supported by the BIOS watermarking calls may comprise red, green and blue color planes, each represented by 8 bits pixels. A standard audio format may comprise 16 bit samples, at a 44 KHz sample rate. Content in other forms, such as MP3, JPEG, MPEG, TIF, GIF, WAV, etc., can be readily converted to and from these standard formats. (Of course, more than one standard format for each type of media may be supported by the BIOS functions.)

The BIOS call can be invoked by conventional methods, such as by an interrupt request, or otherwise. Data passed to the BIOS function can include the data that is to be included in the watermark payload, the strength at which the watermark is to be encoded, and other such encoding parameters.

In arrangements like that taught in U.S. Pat. No. 6,614,914, where the watermark includes a steganographic orientation pattern, a BIOS function may simply report the presence/absence of this signal, or it may return affine orientation data useful in subsequent recovery of watermark payload data. Conversely, a BIOS function can encode such an orientation pattern in any content data passed to it.

The present assignee, Digimarc, offers a service, PictureMarc, by which photographers are assigned Creator IDs, which they can thereafter watermark into their imagery. Third parties who encounter an image bearing a watermarked Creator ID can consult a MarcCentre database, also maintained by the assignee, to look up the corresponding photographer, and learn information (e.g., re licensing) concerning the image.

Currently, the Creator IDs are arbitrarily assigned by the assignee. Instead, however, the ID used by a photographer to mark his or her imagery can be a UID associated, e.g., with the photographer's computer. For example, it can be a PUF-based identifier associated with the processor chip in the photographer's computer. This UID can be provided to the assignee, associated in the MarcCentre database with the photographer's information, and used in lieu (or in addition to) a Digimarc-assigned Creator ID.

In such arrangements, a BIOS watermarking function can be invoked to embed this PUF-based identifier into an image (or into any other content for which BIOS watermarking is supported).

If the photographer uses several computers, or replaces one computer with another, the UIDs associated with each computer are entered into the MarcCentre database in association with that photographer. A third party query for any of the UIDs will be properly associated with information corresponding to that photographer.

In still other arrangements, the BIOS provides one or more component functions useful in watermark encoding or decoding operations. These include FFT, downsampling, resampling, filtering, and log-polar remapping. These, and other such component functions, are detailed in the '914 patent. The provision of such services enables the BIOS functionality to be useful with a wide range of different watermark types and formats, rather than supporting just one specific watermark protocol. And, once implemented, this functionality can be exercised by any watermark-related process running on the system, or related systems—all without the overhead of usual software development (e.g., code writing, debugging, documentation, Q/A, etc.).

Such watermark-related functionality in the BIOS of a computer system can be exercised by processes running on processors other than the main microprocessor. For example, an auxiliary graphics processor or hardware codec installed in an AGP or PCI slot can invoke such functionality to embed or read watermarks in video. Likewise, the microcontroller in a scanner or printer that is attached to the computer through a USB port can similarly invoke such functionality. Support for such operations in BIOS makes them intrinsic to the system—available to any process that can make a BIOS call.

Since the BIOS is, architecturally, most closely coupled to the processing hardware, and is generally hand-optimized for particular processors, the performance of such watermark-related operations by the BIOS offers significant performance improvements when contrasted with performing such operations elsewhere in the computing architecture.

Enhancements to BIOS using Data Hiding

In accordance with another general aspect of the present technology, BIOS arrangements are enhanced through use of data hiding techniques, such as steganography.

In certain embodiments, digital watermarking is used to convey—in hidden Form—information relevant to system security, thereby presenting a further hurdle that an attacker must surmount before he can reverse engineer or otherwise compromise the system.

In one such embodiment, the POST process checks integrity of the BIOS, and checks connected hardware resources, to assure that the platform is trustworthy prior to loading an OS or application. Instructions or data for doing so may be obfuscated, such as hidden using steganography. They may optionally be encrypted. For example, early in the boot process, a checksum for the BIOS code may be computed, and the result checked against a reference value that is steganographically concealed within other data.

In another arrangement, a watermark is encoded in content stored on the computer's hard disk, e.g., in its boot record. (The watermark payload may comprise, e.g., a hardware-based identifier, such as of the memory chip containing the BIOS. The "splash screen" displayed during boot-up is one graphic that may be watermarked.) During POST process, this content is examined for the expected watermark. If the expected watermark is not found, it may indicate that the hard disk has been swapped, and a corresponding exception procedure can be followed. (The exception procedure may perform one or more of, e.g.: disabling or limiting system operation; refusing to connect to external networks or devices; sending an alert to a system administrator; storing forensic tracer data in the computer, etc.)

In some arrangements, the graphic is embedded with a new digital watermark at least once during each session (e.g., between power-up and power-down). When the prior watermark is read during the POST process, it is checked to confirm that it corresponds to the payload embedded during the last session. (The prior watermark may be removed using known reversible watermarking techniques, e.g., as disclosed in commonly-owned patent application 20030149879, prior to application of the new watermark.)

Some of the information collected during the POST process can be hidden by the BIOS in other data. For example, the presence and/or identification of certain types of hardware can be noted by digitally watermarking same in other host data.

Consider a computer system in which the BIOS checks the system configuration, and compares it against a previously-approved configuration. (It may do this, for example, by computing a system signature, or a hash thereof, and comparing same against reference information that is steganographically encoded within other data.) The BIOS may give access to certain cryptographic keys necessary for subsequent utilization of trusted applications and data only if the system is found to be in an "approved state."

In such an arrangement, if the BIOS detects the presence of any hardware that does not form part of the previously "approved" system configuration (e.g., a keychain USB drive), it may note same, e.g., for forensic purposes. Desirably, such reported data is obfuscated—just in case the "non-approved state" is due to some malicious circumstance.

More generally, the BIOS can implement various forensic data logging capabilities. Commonly-owned U.S. Pat. No. 6,549,638 details various covert tracing arrangements by which information about a computer system (or its user) is hidden in a system for later recovery and use, e.g., for forensic purposes. Likewise, system configuration information detected during the POST process, as well as other information available to the BIOS, can be hidden within the system's various resources before the operating system is loaded, either routinely, or only if an exceptional condition (such as detection of an unauthorized computer configuration) is encountered.

Data hiding techniques can be used in various other ways to enhance security and enhance device authentication. One is simply to make reverse-engineering of the BIOS more challenging. By obfuscating the manner and order of BIOS operations, a hacker's task is made more difficult. If the operations undertaken by the BIOS (e.g., in the POST process), or their sequence, are determined in part by reference to instructions or data that are steganographically represented in other data, the hacker is disadvantaged.

Likewise, by reference to hidden data, the BIOS can check the integrity and authenticity of the OS, applications programs, and connected devices. This may be done, for example, by storing checksum, digital signature, or other validation data in a steganographically-encoded representation, which the BIOS can consult as needed. Again, since the information is concealed, it is less vulnerable to tampering.

Encryption techniques are finding increased use in BIOS arrangements, as elsewhere. System security can be enhanced by obfuscating the location and/or usage of decryption information (or decrypted data) within the BIOS processes. Again, such information is desirably obfuscated by employing steganographic techniques. For example, a key may be concealed within the least significant bits of a splash screen graphic displayed at boot-up, or by a pattern of registers employed for temporary data storage. Likewise, the memory address at which a needed decryption key can be found may be represented as a digital watermark encoded into some other host data.

Likewise, digital signature technology is finding increasing applicability in BIOS applications. For example, updated firmware may be digitally signed to combat tampering with core system functionality. The signature may be hidden—stored as a digital watermark in some other data. Or the information on which the signature is based may itself be hidden as a digital watermark in other data. Again, a layered security approach in which steganographic techniques are employed to complement digital signature technology results in a more secure solution.

In still other embodiments, the BIOS can enhance the security of the operating system or applications software that runs after the POST process, by providing services relating to data obfuscation, e.g., with such services being useful in determining how, when, and where certain data or instructions are stored (e.g., in watermarked fashion) in memory. Again, techniques like those noted above can be employed, with such functions being made available to the higher level software through calls to the BIOS.

These arrangements generally enhance the trustworthiness of computing devices, rendering them—and the networks of which they are a part—less vulnerable to attack.

Other Enhancements to BIOS

Other enhancements to the BIOS do not necessarily rely on watermark technology. For example, a BIOS may be equipped with functionality by which it can report—to inquiring programs—whether a debugger program is active. (The BIOS, with its intimate knowledge of hardware states, can discern the presence of a debugging process more reliably than can other approaches.) If the BIOS reports that a debugger is active, a program or OS may alter its operation to confound an attacker (e.g., by changing an order of operation, by using alternative memory locations, by executing dummy code in lieu of intended code, etc.).

As noted, another function that BIOS may serve is to assure system integrity, before handing over system control to the operating system or the user. During the POST process, the BIOS identifies all of the devices and peripherals attached to the system. Using an approach like that detailed in U.S. Pat. No. 6,148,407, the BIOS can compute a system signature. This signature can then be compared against the signature last logged by the system (e.g., during the last boot process, or sometime thereafter), or against other reference information (e.g., corresponding to an "approved" configuration) and if a discrepancy is noted, then an exception procedure can be followed. (A similar arrangement does not compute a single system signature, but rather relies on identifiers associated with different component devices: processor; graphics card; network adapter card, etc. Again, if any has changed since the last time such information was logged, an exception procedure can be followed.)

The system signature, or an inventory of some or all of the connected devices, can also be transmitted by the BIOS to a remote registry (e.g., an enterprise configuration management database, which may be maintained by a dedicated server or provided as a service on another system, e.g., by an enterprise router). Again, a comparison can be made of the system configuration sensed by the POST process against a most-recent configuration (or an authorized configuration), and an exception procedure instituted if there is a variance.

As part of the POST process, the BIOS can also generate a pseudo-random number that is unique to that particular boot-up, and is associated with that particular hardware. Such a number can be used, e.g., as a session identifier.

This can be done, e.g., by sensing a hardware-based UID in or of the system, and appending data indicating the date/time. The result can optionally be encrypted with a private key. This session ID can be provided to inquiring operating system or software applications that make calls for same to the BIOS, and can be used in the various applications detailed herein (just like other hardware-based identifiers). Where encryption is employed, systems having knowledge of the corresponding public key can process the session ID to recover the UID of the hardware, as well as the date/time of the session.

One use of such a session ID is to seed a random number generator which serves as a one-time pad, yielding a sequence of data. The data in this sequence can be used as keys for encrypting other data. Or data in this sequence can, themselves, serve as hardware-based identifiers—in the various different capacities that such identifiers are described as serving herein, as well as others. (This random number generator can be a BIOS-based function, or can be a software program loaded with, or after, the operating system.)

Another use of such a session ID is in cell phone systems. When powered-on, the cell phone BIOS generates a session ID and passes it to the central network. The central network checks to ensure that the hardware-based identifier revealed by this session ID is unchanged from the last time this cell phone registered with the network. (The hardware-based identifier thus supplements the phone number and other data by which a phone identifies itself to the cellular network, and serves as a cross-check.) The phone may optionally capture an image of the phone user, compute a facial fingerprint from salient facial features, and verify that the current user matches the authorized user.

As indicated, a BIOS can help enforce a security policy. In a particular example, some enterprises may wish to prevent network access by systems having an attached USB device, or having a removable-media storage device. The BIOS can check for the presence of such a disqualifying configuration, and disable network connectivity if any such device is found. (Disabling of network access can be performed in various ways. For example, the BIOS can locally disable the computer system's network interface card, e.g., by not reporting it as among the attached devices when loading the operating system. Or the BIOS can send data to a router to which the system is linked, instructing that user traffic to and from this system should be forbidden until the system is restored to an acceptable configuration.) Alternatively, upon detection of such a non-compliant configuration, the BIOS may simply refuse to load the operating system.

While the foregoing arrangements impair operation of a computer system if an extra, non-compliant, component is detected, a similar procedure may be followed if a necessary component is not detected. For example, some enterprises may require that a hardware dongle (or other security device) be sensed (e.g., on a computer's parallel port). If not detected, the BIOS may refuse to load the operating system. Such enterprises may, as a routine policy, disconnect hardware dongles each evening and put them in a vault. If the computer is stolen during the night, the BIOS check will render the computer inoperative. (Such an arrangement may be used, e.g., by state Department of Motor Vehicle offices, which have driver license issuance computer systems distributed in a hundred or more offices around a state, and which might be the target of theft.)

This approach is believed to offer a security improvement over prior art arrangements, in which presence of a dongle is checked by an application software program. In the circumstance of a successful theft, the thief has an operating computer, with the operating system loaded, and a clear target (a disabled application software program) to attack. Better is an arrangement in which absence of the necessary component prevents the operating system from even loading, hindering further attacks. (In a belt-and-suspenders mode, both the BIOS and the application software program can check for presence of the necessary system component, with operation impaired if it is not detected.)

A related security technique is not to store certain critical software on the computer. Consider the case of software used in issuance of driver licenses. Before the operating system is loaded (but, desirably, after the computer configuration has been found to be secure), the BIOS can obtain this software (or a critical part thereof) from a secure network resource and load it into memory. Or after receiving the software from the network resource, the BIOS can write it to a part of the disk that is not accessible to the operating system, and thereafter load it into memory in response to a call to the BIOS. By such approaches, sensitive software can be shielded from many forms of attack, e.g., those in which an attacker loads a debugger program prior to loading the software, or those that rely on the software being resident on the disk, and conventionally accessible, prior to loading.

In still other enhancements, BIOS can be equipped with a cryptographic engine, or component(s) therefor. Whenever a process needs to encrypt or decrypt a file, or compute a digital signature, etc., the application program (or operating system) can invoke the BIOS crypto routines to perform the process (or a part thereof). A conventional system interrupt can invoke such services, or other invocation techniques can be used.

In yet other enhancements, different computers can have different BIOSs, enabling different levels of functionality. In some such arrangements, BIOS can serve in a manner like a hardware "dongle"—i.e., only computers with certain BIOS features are qualified to perform certain functions.

Consider specialized application software for use by national central banks to design banknote artwork. This software, when launched, may first do a BIOS call to confirm that it is not running on a mass market computer system, but rather is running on a specific system (distinguished by its BIOS) on which use of such software is anticipated and authorized. If the BIOS response indicates otherwise, the application software will refuse to load and run.

More generally, such arrangements can be employed to tier generic computer platforms into different echelons of capabilities, for which different pricing might prevail.

There once was a time when a computer buyer had to purchase more expensive hardware to handle more sophisticated tasks. A basic user, interested just in email and word processing capabilities, could purchase a simple, inexpensive, machine (e.g., $1,000). An intermediate user, interested in sometimes watching high quality MPEG movies, required a more expensive, sophisticated machine (e.g., $3,500). And a professional computer graphics artist, wanting to render 3D animation, required something closer to a desktop supercomputer (e.g., $15K). Increasingly, however, advancing technologies and economies of scale have tended to collapse this spectrum of hardware capabilities, with basic users obtaining hardware having capabilities that are usable by professionals.

While this may be viewed as advantageous in some respects, it can also be viewed as basic users paying more than they need to (and professional users paying less than they'd be willing to). In such an environment it may be attractive to restore some manner of differential pricing. Thus, for example, a few years from now a generic 50 GHz Pentium 9 box, with a ten gigabytes of RAM, etc., might cost—if equipped with a basic BIOS—$200. The same box, equipped with an intermediate BIOS—might cost $750. And the same box, equipped with a professional BIOS—might cost $2,500.

Basic programs, such as Outlook Express and Photoshop Elements, would run on all such platforms. However, certain premium software, such as Adobe Photoshop CS and Premier, would check—each time they are invoked—to see if the platform is equipped with an intermediate BIOS. If not, they would decline to run (or might run in a limited function state, or run if an extra one-time or recurring fee were paid). And professional software, such as Avid's AlienBrain Studio 7.1 video rendering software, would only run on platforms having the professional BIOS.

Different BIOS chips may be provided in the three different classes of computers. Or, the same BIOS chip may be installed in all computers; the distinction can arise from their unique identifiers.

As detailed above, individual hardware devices and systems can be identified by a variety of technologies. When a customer takes home the hypothetical Pentium 9 generic computer noted above, the initial start-up routines can link to a remote database, which gives the user an option to upgrade the computer's initial "basic" status to "intermediate" or "professional." If the user pays for such an upgrade, the database stores a record that associates the UID of the computer (e.g., an identifier derived from behavior of the BIOS chip) with the upgraded capability. Thereafter, if the user wants to run AlienBrain Studio software (or any other process requiring something more than basic configuration), this software can check the remote database and confirm that the platform on which it is running is qualified to do so.

Naturally, such tiering of computers needn't rely on differences in BIOS (or BIOS identification); computers can similarly be distinguished, e.g., by their processor UID or any other hardware-based ID—again, associated in a database with the level of capabilities that computer is to enjoy.

Of course, if regular access to a remote database is problematical, the BIOS itself can determine its own level of capability. If this level needs to be updated, the BIOS can be updated once (e.g., by BIOS flashing). Again, this flashing can be part of an on-line upgrade procedure, e.g., involving payment.

The funds received in exchange for upgrading to a higher tier of computer capability can be distributed in different ways, among different parties. In one arrangement, the vendor of the computer system (e.g., Dell) gets essentially all of the fee (probably less a small percentage to any online service provider that facilitated an upgrade). Dell may redistribute the fee among different of its vendors. E.g., if the BIOS is upgraded to permit 3D rendering of professional movies, then a share of the fee may properly be due to the provider of the graphics card whose capabilities will be more fully exploited by the user. The fee can be similarly shared with providers of other hardware (or software) components.

More on Electronic Content

The technologies detailed herein find various applications to electronic content (e.g., audio, video, still imagery, office documents, etc.).

For example, an identifier (such as any of those detailed earlier, including but not limited to PUF-based UIDs, system signatures, etc.) can be digitally watermarked in content as it is delivered, or stored, or rendered, on a computer. Or such an identifier can serve as a seed of a function (e.g., a cryptographic function) which generates data that is included in the payload of a watermark applied to such content. Through such techniques, content can be logically associated with the computer to which it is delivered, or on which it is stored or rendered.

(Prior art proposals for forensically tagging electronic content have generally relied on identifiers stored in a conventional memory—sometimes in encrypted form). Or the identifier is based on a single hardware trait, such as a MAC address. Arrangements like those described herein, in which the identifier is more intrinsic to the computer system and less susceptible to attack (e.g., by changing a network adapter, and with it a MAC address) are often preferable.)

Such a process that marks content as it is delivered, stored or rendered, can be performed as a BIOS operation. Or the operating system—whenever called to provide a service, such as file-open, on a file recognized as being a media file—can automatically look to see if the file already has a system-identifying watermark in it (e.g., by performing a watermark detection function). If not, the operating system can then invoke a process that watermarks such file. Or such embedding can be performed by any of myriad other processes and systems, such as by a peripheral software driver, by a hardware watermark embedder circuitry, by an application software program, etc., etc.)

In some arrangements, a watermark is not always applied to electronic content, but only in certain instances. For example, commonly-owned U.S. Pat. No. 6,345,104 discusses how watermark data can be inserted into image data only if the imagery is believed to have been scanned from a banknote. Similar arrangements can be employed more generally—embedding a watermark only if certain criteria are met, or are not met. (While the prior patent embedded watermark data only if the imagery gave rise to suspicion of counterfeiting, in other arrangements, a watermark might be applied only if the content is believed to have or lack a desired quality, e.g., a certain provenance, or trustworthiness.)

Forensic tagging of content data finds particular application in trusted computing environments. While trusted computing generally focuses on avoiding rogue instructions from being executed, a parallel threat is posed by untrustworthy content data. A watermark in electronic content can serve as an indicator of its trustworthiness, and authorize content to enter into a secured part of the system architecture (a "protected domain").

Consider an enterprise network, in which all content delivered to a desktop machine is to be routed through one or more firewalls. All incoming traffic that comes through the computer's network adapter can be checked (e.g., by reference to IP address data in the incoming packets) to assure that it came through the expected firewall(s), and upon such determination, can be watermarked by the computer (or component thereof) with an identifier signifying such routing. (This watermark identifier can include, or be based on, one of the system-specific identifiers reviewed above; again, the watermarking can be done in conjunction with BIOS functionality, or otherwise.) Any content found on the computer without such telltale marking is suspect (e.g., delivered to the system by a USB keydrive or other unchecked source), and can be refused by processes that require trustworthy data.

In a related system, all content that is received by, or stored in, a computer system is watermarked with a watermark payload that includes an identifier of the data source. If music data is received by the network adapter from iTunes, at IP address 17.254.3.50, same is indicated in the watermark with which it is watermarked at the time of its receipt. If image data is acquired by a TWAIN interface from a hardware scanner connected to a computer system, this fact is again indicated in a watermark with which it is immediately tagged. (Such source-identifying watermarks can also include other information, such as the date/time of data acquisition, an identification of the user who is logged into the operating system at the time of data acquisition, etc.) Again, such watermarking can be accomplished by use of a BIOS watermarking function, or otherwise.

There was a time when the BIOS was involved in most data transfers within a computer architecture. Increasingly, such transfers now are accomplished without BIOS involvement. Nonetheless, the BIOS can serve a valuable traffic-monitoring function—watching such data transfers as it is privy to, and decoding watermarks embedded in such data. The decoded information is useful for a variety of purposes, such as tracking usage of content, assuring the provenance of data passed to certain programs, tracking location of information for desktop and other search purposes, etc. (Again, each of these applications often also benefits by use in conjunction with a database of related information, e.g., metadata. Thus, e.g., if a BIOS notes that a JPEG image has a watermark of 3DF285, this information can be used to access a database (local, or remote) that may indicate that the image is a picture of Lake Sirmione, Italy, taken Jul. 11, 2004, by photographer John Smith, etc., etc. This additional data can be presented, e.g., in desktop search results related to this image. Each time the BIOS detects a content watermark, it can check with various databases to obtain such complementary information.)

While digital watermark technology has many advantages for identifying content, a different technique—content fingerprinting (sometimes terms "content signatures")—can sometimes be used. Content fingerprinting seeks to distill content (e.g., a song, a graphic, a video, a facial portrait, etc.) down to an essentially unique identifier, or set of characteristics. Many fingerprinting techniques are known. Some are based on robust hashing. Some are based on calculation of eigenvalues or other identification of unique features. Such technology is illustrated, e.g., by commonly-owned patent application 20020028000, and by U.S. Pat. No. 6,834,308 (audio fingerprinting; Audible Magic); U.S. Pat. No. 6,301, 370 (face recognition; Nevenvision); and U.S. Pat. No. 5,893, 095 (video recognition; Virage).

Fingerprint-based content identification generally relies on matching the derived identification information with an identifier in a database, which database correlates the identifier with information about the content. Thus, e.g., the database may associate content fingerprint 458FE28AB with the song *Night and Day*, recorded by Frank Sinatra, released as track #27 on the CD *My Way* released by the Wea record label on Nov. 20, 2000, with ASIN code B000024SLM, copyright by the estate of Frank Sinatra, 1961.

The functions and arrangements described herein as relating to watermarking can generally also be adapted to fingerprinting. For example, the BIOS can provide support for computing a content fingerprint of any audio or video data passed to it. Likewise, the BIOS can monitor data transfers, compute content signatures, and determine therefrom the particular content being processed on the machine (e.g., for rights management, trusted computing, desktop search, and other purposes).

The hardware- and system-based identification techniques discussed herein can be used in a variety of applications beyond the particular scenarios detailed herein. For example, they can be used to track usage of content within a system (e.g., how many times content is rendered). They can also be employed in systems for protecting data secrecy and privacy, for protecting information using digital signature techniques, for securing software using obfuscation techniques, for securing electronic commerce, for combating piracy, and for rights management, as variously disclosed in InterTrust U.S. Pat. Nos. 6,832,316, 6,618,484, 6,640,304, 6,658,568, 6,668,325 and 6,785,815.

In still other arrangements, watermarking of content can aid in data recovery.

When a content file is stored on a disk, it is divided into portions corresponding to physical storage blocks on the disk. The disk controller, or BIOS, or a program such as Norton's Ghost, or another process, can watermark each block with an identifier. This identifier can comprise, or include a sequential component. The first block of a video file, for example, may have a watermark payload including it is the first in the sequence for file 7D28 (where 7D28 may be an arbitrary file identifier, or an identifier that increments every half second or so). Likewise the second block, etc. Or the payload can comprise time information about the instant it was written (e.g., a counter that increments with each clock cycle).

If the file system of such disk ever becomes corrupted, the embedded sequence information can be used to reconstruct the content stored thereon. A recovery program may, for example, read all the blocks of the disk, and aggregate together—in the indicated sequence—those that appear to be associated together. All the blocks bearing a watermark indicating they belong to file A7D28, for example, can be grouped together, ordered by sequence numbers. Likewise, blocks with sequential time information embedded therein can be similarly grouped and assembled together.

Such a recovery routine may form part of the computer's basic BIOS functionality. Or it may be integrated into disk utilities, such as those available from Symantec.

Concluding Remarks

To provide a comprehensive disclosure without unduly lengthening this specification, applicants incorporate by reference the patents, patent applications and papers cited herein.

Having described and illustrated the principles of our technology with reference to illustrative embodiments, it should be recognized that our work is not so limited.

For example, while certain of the foregoing arrangements have been particularly described in the context of BIOS, the line between the BIOS and other system software is becoming less distinct. For example, there is a trend towards "core system software," e.g., pre-OS software that includes functionality commonly associated with BIOS, while also supporting secure storage of encrypted private keys within a computer. Secure storage of encrypted private keys can be enhanced by providing core system software with steganographic capabilities and services that can be invoked to enhance system security, e.g., by hiding keys using techniques such as those referenced above. Thus, the techniques and arrangements discussed above should be understood to be applicable in all pre-OS contexts.

Likewise, many computer systems include an updateable BIOS, e.g., stored in flash memory or EEPROM. Such systems typically also include a portion, sometimes termed the "boot block," that is stored in ROM and is not updateable. Code in the boot block runs first and verifies that the rest of the BIOS is intact before it is used. It should be recognized that features described above as being in BIOS can be implemented as part of the boot block code, to further protect against tampering.

Similarly, computers increasingly have more than one BIOS. For example, plug-in adapter cards such as USB hard disk adapters and video boards may have their own BIOS, complementing or supplanting code in the main system BIOS. Accordingly, it should be understood that features described above as being in BIOS can similarly be implemented in one of these secondary BIOS stores.

Still further, while certain functions were described as being implemented in BIOS (and such implementations have various advantages), the same or similar functions can likewise be implemented after conclusion of the POST process, e.g., by the operating system, by applications software, or by other system processes.

For example, while the foregoing description detailed how a session ID could be generated by the POST process, the same can likewise be generated by the operating system—using as inputs a hardware-based ID, and data indicating a date/time that the operating system was loaded. Likewise, one-time pad data can be generated without involvement of the BIOS.

While reference was made to watermark payloads having certain contents (e.g., identifiers of data source, etc.), it will be recognized that similar functionality can be achieved by embedding as the watermark payload an index number, and then storing related information in a data structure (e.g., a record in a database) in association with such index number. This permits large amounts of data to be associated with a watermark, without a commensurately long payload length.

Likewise, it will be recognized that many of the arrangements described above can advantageously employ a database to associate hardware- and system-based identifiers with particular users. Thus, a database may store information indicating that an Intel Pentium 4 processor with an ID of 4CE982A25 stored in its onboard EEPROM, an ATI graphics card with a Silicon Fingerprint of 80F24EA, a DIMM memory chip with a PUF-based ID of 284BA2, and a laptop computer with a system signature of 33298E34BC, are all associated with Frederick Asimov. The database can include further information about Frederick, including address, phone, email, age and other demographics, etc. It can also include further information about each of the hardware components and systems to which the respective identifiers correspond.

Such database can be stored in one or more locations. It can be stored in Frederick's computer. Or it can be stored elsewhere at Frederick's home or office, e.g. in a router, server, or other device within a home or office network. Or it can be stored remote from Frederick's home or office, e.g., at an ISP, at a domain name server, at Google, etc., etc. Such databases may be consulted to enable and enhance different behaviors and responses keyed to Frederick's IDs.

It will be recognized that the hardware-based identifiers discussed herein can be employed to detect product tampering. For example, a particular BIOS chip and a particular Pentium processor may be installed on a circuit board shipped by computer vendor, and their identifiers are logged in a database maintained by the vendor. If the product is later presented for support, these identifiers can be checked against the database record to assure that no component has been swapped-out, e.g., voiding a warranty. (The hardware device IDs may be determined when the product is brought to a repair station for service, or they may be sensed by online update procedures, such as are commonly employed by Microsoft, Dell, IBM, and others.)

In like manner, grey market importation of goods not intended for certain national markets may be detected by reference to hardware-based identifiers.

Hardware-based identifiers can also be used to check that certain hardware devices are intended to be used together. Such relationship can be memorialized in a database, or other techniques can be used. For example, the UIDS of a processor and a BIOS chip in a computer can be summed, and the result stored in a non-volatile memory in the computer.

It will further be recognized that the watermarking technology employed in many of the arrangements described herein does not need to be particularly robust. For example, in the case of watermarking a splash screen image displayed at boot-up, it is not necessary for such an image watermark to survive printing/scanning, or affine transformation, etc. The image is, and remains, in digital form, and is not generally altered. Accordingly, the watermark can often be relatively (or entirely) frail, allowing the payload size to be increased commensurately.

Likewise, while watermark encoding (embedding) and decoding sometimes connotes complicated mathematic manipulations, this need not be the case where robustness is not required. For example, the reference data that is used to determine whether a computer system is in an "approved state" (e.g., one in which trusted applications and data may be loaded) may be hidden simply as the least significant bits of a particular set of data. These can be easily read and interpreted as data. (These may be encrypted, if desired, and decrypted as needed.) Likewise, watermark encoding can be as simple as inserting a pattern of irrelevant instructions (e.g., NOPs; i++ followed by i--; increments to unused registers; etc., etc.) into other instructions, with the pattern representing the data being encoded.

Moreover, while reference has been made to watermark encoding and decoding of image data (e.g., the splash screen), it will be recognized that the same approach can likewise be applied to any other host data that can be subtly altered to convey a digital watermark payload (e.g., audio data, certain software code, etc.).

The foregoing description did not belabor the mechanics of on-line payment mechanisms which can be employed in certain of the embodiments, because such technologies are well known to those skilled in the art, e.g., as illustrated by on-line vendors such as Amazon and iTunes.

Although many of the arrangements detailed above refer to identifiers that are derived from, or uniquely associated with, particular computer systems or hardware devices, many arrangements can make use of other identifiers. For example, a content vendor (such as iTunes) may assign a user a unique ID. This ID may or may not have a relationship to unique user hardware, yet many of the arrangements detailed above can make use of such an ID.

While reference has sometimes been made to "components" of a computer system, it should be understood that such components are not limited to hardware devices. For example, software is another component of a computer system.

It should be recognized that the technology detailed herein is useful more broadly than just in conventional computer systems. Rather, such technology can be employed in myriad other environments, among them network routers, games (XBox, PSP), cell phones and other wireless appliances, PDAs, digital cameras, audio (e.g., MP3) record and/or playback devices, set top and cable boxes, etc. Accordingly, terms such as "computer" should be given a broad interpretation to encompass such devices. (Consider a cell phone that embeds, in all audio data it sends, an identifier of the hardware processor. Even if the phone is stolen and reprogrammed with a new phone number, the processor identifier remains the same and can be used to track down and recover the stolen phone. Likewise, consider a digital camera having a BIOS function that is automatically called each time an image is captured, and that embeds in the image a watermark based on a UID associated with one or more hardware or system components of the camera.)

It should be recognized that the watermark encoding and decoding operations referenced herein may be performed (in whole or in part) by application specific integrated circuits (ASICs) that are dedicated to such tasks. A unique ID for each such hardware ASIC can be determined, e.g., by the techniques described above. And this UID can be employed in the operation with which such ASIC is involved.

Consider the camera example just mentioned. The watermark embedded in a captured image may comprise, or be based on, the UID of an ASIC involved in the watermarking. (For example, the payload may comprise the UID together with a sequential image number.)

Likewise, consider a watermark decoder, as might be included in the imaging system of a cell phone. The image data captured by the phone's image sensor might be watermarked in accordance with different protocols, one public and one private. (The public protocol may be, for example, the one used to tag paper documents and physical objects with address information by which links to corresponding web resources can determined and loaded for display on the cell phone's display, as marketed by the present assignee under the brand MediaBridge and as described, e.g., in copending application Ser. No. 09/571,422, filed May 15, 2000 (now U.S. Pat. No. 6,947,571). The private system may be, for example, a secure watermarking arrangement used by state departments of motor vehicles to embed digital data in driver's licenses, as marketed by the present assignee under the brand IDMarc).

The cell phone might first analyze the captured image to discern the presence of a watermark that is encoded with the public protocol. If no such watermark is found, the cell phone might then look for a private protocol watermark. However, this functionality is not available to all cell phones. To exercise such functionality, the cell phone must be authenticated for such use.

To effect such authentication, the cell phone software may transmit to a remote facility the UID of the phone's hardware, such as its watermark decoder ASIC. This identifier is then checked against a database of cell phones that are authorized to read IDMarc watermarks, e.g., cell phones owned by law enforcement agencies. If the remote database determines that the inquiring phone is authorized to decode IDMarc watermarks, then it returns to the cell phone the key data needed for this purpose. Upon receipt of such key data, the cell phone can then attempt to read an IDMarc watermark from the captured image data.

(Of course, rather than trying to decode a public watermark first, a law enforcement officer might immediately instruct the phone—through the phone's user interface capabilities or otherwise—to read an IDMarc watermark from a driver license.)

More generally, functionality of an electronic system can be enabled only after the system provides its hardware-based UID to an authorization server, which checks that the identified system is authorized to perform a particular operation and, if so, transmits to the system certain data or instructions permitting the operation to be performed. Such architectures find applicability not just in specialized areas, such as reading driver license watermarks, but also in more mundane applications, such as consumer downloading of music and videos.

In some such applications, the authorization must be periodically renewed, such as every 5 seconds, every 5 minutes, etc. (There are many other applications in which periodic re-identification of a system may be required. This can be accomplished by periodically interspersing a system's hardware-based UID in data sent from the system.)

While the foregoing discussion assumed, for expository convenience, that a computer or hardware device generally has a single UID, this may not be desirable in situations in which a computer has several different users, and each should have their own UID. In such cases, a hardware-associated identifier (e.g., a PUF-based ID associated with a microprocessor) can be concatenated with, encrypted by, or otherwise processed in conjunction with, a user identifier (such as a network login, which differs for different users), permitting each user to have a UID. Each UID is related to the hardware, but permits distinction between users.

It will be recognized that an identifier of a particular hardware device or data processing system can be used in applications beyond those detailed above. For example, such an identifier can be transmitted in some or all of the data packets sent by a device. Such an arrangement has many advantageous uses. For example, it allows enterprises to confirm the origin of network traffic. Consider a case where a UID is associated with the main BIOS chip in each enterprise computer, and is included in each packet it transmits. If a corporate router encounters traffic not bearing such an identifier, or bearing an identifier it doesn't recognize, an exception procedure may be followed. A router may also implement different policies depending on the UID of the originating computer. Computers dedicated to handling sensitive information may by so-identified to the router by reference to their UIDs, and be virtually isolated from computers outside the corporate network, to avoid accidental or deliberate distribution of protected information.

Routers, and other devices, can also maintain registries of associated metadata for different of the hardware and systems within an enterprise network. This metadata can enhance the functionality and security of the network. For example, if a router knows that the computer having a BIOS Silicon Fingerprint of 2FA934AB is associated with John Doe, and the router sees outgoing email traffic bearing that identifier in packet data, but indicating Jane Public as the sender, it can identify the traffic as suspicious and take appropriate action.

Such arrangements provide enhanced security regardless of the communication channel employed. Whether the computer is sending data from a 10 Base T link, a cellular modem, a wireless modem, an IR link, etc., the BIOS identifier does not change, and can provide a consistent means of identifying the transmission source.

It will likewise be recognized that the techniques detailed herein are well suited for use in conjunction with Voice Over IP (VOIP) technologies. Outgoing audio may be watermarked, e.g., by calls to the BIOS, prior to transmission. Outgoing data packets can be tagged with a hardware identifier associated with the originating system. Incoming audio packet data can be checked for the hardware identifier of the originating system. The incoming audio may also be checked for watermark data—again by BIOS services or otherwise. Transmissions missing a hardware identifier in the packet data, or missing a watermark in the audio may be treated differently than transmissions including such data. Different system responses can be triggered depending on the hardware identifier and watermark information detected in the incoming data stream. Such arrangements can provide and extend enhancements to security and functionality. (E.g., by logically tying VOIP data to particular physical hardware, spoofing is made more difficult.)

More generally, the technology detailed herein can provide an essentially irrefutable, consistent physical token of identity, e.g., based on physical hardware. Consider a user of a laptop. The laptop has a processor. The processor has an essentially unique ID, e.g., based on one or more of the hardware identification techniques detailed earlier. This identifier can be digitally signed with the private key of the user's public/private key pair. Wherever the identifier goes, and however it is used, it uniquely identifies the user. This identifier can be watermarked into photographs, embedded into VOIP calls, included in the header or body of packets sent by the user, etc., etc.

It is generally accepted that, despite best efforts to the contrary, a perfectly secure computing platform is an unattainable goal. There will always be paths by which data can creep into, and leak out of, nominally secure architectures. By tagging data with identifiers as described herein, whether by steganographic marking of content data, by packet tagging, or otherwise, the harm posed by such leakage paths is mitigated, since leaked data can be traced as to its origin.

In view of the many embodiments to which the principles of our technology may be applied, it should be recognized that the detailed embodiments are illustrative only and should not be taken as limiting the scope of our technology. Rather, we claim all such embodiments as fall within the scope and spirit of the following claims, and equivalents thereto.

We claim:

1. A device comprising:
a processor configured to employ BIOS code, wherein the BIOS code is configured to perform a power-on self-test sequence of operations, collect hardware configuration information, and provide the hardware configuration information in connection with initiating an operating system; and
a non-volatile memory configured to store at least a portion of the BIOS code, wherein the BIOS code includes code to perform one or more functions of: watermark decoding, watermark encoding and content fingerprinting, wherein the BIOS code is configured to allow the one or more functions to be invoked by a process that runs after an operating system has been initiated.

2. The device of claim 1, wherein the BIOS code is configured to decode digitally watermarked information from stored host data.

3. The device of claim 2, wherein the information decoded from the digital watermark allows the BIOS code to perform a cryptographic operation.

4. The device of claim 1, wherein the BIOS code is configured to decode the digitally watermarked information during an initial phase of system operation, prior to loading of the operating system.

5. The device of claim 4, wherein the stored host data comprises image data stored on a data storage disk.

6. The device of claim 4, wherein the processor is further configured to compare the decoded digitally watermarked information with reference information to determine whether there is correspondence in an expected manner.

7. The device of claim 4, wherein the processor is further configured to remove the digital watermark information from the host data and replace the digital watermark information with new digital watermark information.

8. The device of claim 4, wherein certain instructions or data employed during the initial phase of operation are hidden using steganographic techniques.

9. The device of claim 8, wherein certain data used to check the integrity or authenticity of a component is encoded as a digital watermark in other data.

10. A method comprising:
    executing BIOS code to perform a power-on self-test series of operations in a system, wherein the system comprises a semiconductor device;
    initiating operating system software;
    determining an essentially unique identifier associated with the semiconductor device before initiation of the operating system software, and after an initial boot phase of operation, wherein data related to the identifier is made available to application software executing on the computer system, wherein the semiconductor device comprises a memory in which at least a portion of the BIOS code is stored; and
    generating a session identifier by reference to the data, wherein the session identifier is different each time the computer system is booted.

11. The method of claim 10, wherein the session identifier is a function of data that changes with time.

12. The method of claim 10, further comprising seeding a pseudo random number generator with the session identifier.

13. The method of claim 12, further comprising using data produced by the pseudo random number generator in connection with a cryptographic operation.

14. A method comprising:
    digitally watermarking an audio or visual content object with data; and
    determining from a semiconductor device an identifier associated therewith, the identifier being essentially unique because of random process variations inherent in fabrication of the semiconductor device, and wherein the watermark is determined, at least in part, by reference to the identifier.

15. The method of claim 14, further comprising digitally watermarking the captured image data with the watermark payload that is determined by reference to the identifier.

16. A method employing a computer system with a semiconductor device, the method comprising:
    executing BIOS code to perform a power-on self-test series of operations during a boot phase of computer system operation;
    initiating operating system software;
    determining an essentially unique identifier associated with the semiconductor device, the identifier being essentially unique because of random process variations inherent in fabrication of the semiconductor device; and
    making data related to the identifier available to a computer system process that follows the initiation of the operating system software.

17. The method of claim 16, wherein the semiconductor device comprises a memory in which at least a portion of the BIOS code is stored.

18. The method of claim 16, further comprising generating a session identifier by reference to the data, the session identifier being different each time the computer system is booted.

19. The method of claim 18, wherein the session identifier is a function of data that changes with time.

20. The method of claim 18, further comprising seeding a pseudo random number generator with the session identifier.

21. The method of claim 20, further comprising using data produced by the pseudo random number generator in connection with a cryptographic operation.

22. A method employing a computer system with a semiconductor device, the method comprising:
    executing BIOS code to perform a self-test power-on series of operations during a boot phase of computer system operation;
    initiating operating system software;
    determining an essentially unique identifier associated with the semiconductor device;
    generating a session identifier by reference to data related to the identifier, the session identifier being different each time the computer system is booted; and
    providing the session identifier to a software application or the operating system software.

* * * * *

UNITED STATES PATENT AND TRADEMARK OFFICE
CERTIFICATE OF CORRECTION

PATENT NO. : 8,051,293 B2  Page 1 of 1
APPLICATION NO. : 12/115341
DATED : November 1, 2011
INVENTOR(S) : Calhoon et al.

It is certified that error appears in the above-identified patent and that said Letters Patent is hereby corrected as shown below:

Title page, item (56), under "Other Publications", in Column 2, Lines 18-20, delete "Ravikanth, "Physical One-Way Functions," Ph.D. Thesis, MIT, Mar. 2001. Clarke et al, "Secure Hardware Processors Using Silicon Physical One-Way Functions," MIT, Mar. 2002." and
insert -- Ravikanth, "Physical One-Way Functions," Ph.D. Thesis, MIT, Mar. 2001.
Clarke et al, "Secure Hardware Processors Using Silicon Physical One-Way Functions," MIT, Mar. 2002. --.

Signed and Sealed this
Twenty-second Day of May, 2012

David J. Kappos
*Director of the United States Patent and Trademark Office*